US012745760B1

(12) United States Patent
Hoang

(10) Patent No.: US 12,745,760 B1
(45) Date of Patent: Sep. 29, 2026

(54) ROTATING FILTER ASSEMBLY AND METHOD OF USE IN AQUACULTURE

(71) Applicant: Dung Minh Hoang, Cumberland, MD (US)

(72) Inventor: Dung Minh Hoang, Cumberland, MD (US)

( * ) Notice: Subject to any disclaimer, the term of this patent is extended or adjusted under 35 U.S.C. 154(b) by 0 days.

(21) Appl. No.: 19/285,305

(22) Filed: Jul. 30, 2025

Related U.S. Application Data

(60) Provisional application No. 63/687,874, filed on Aug. 28, 2024.

(51) Int. Cl.
*A01K 63/04* (2006.01)
*A01K 61/10* (2017.01)

(52) U.S. Cl.
CPC ............ *A01K 63/045* (2013.01); *A01K 61/10* (2017.01); *A01K 63/047* (2013.01)

(58) Field of Classification Search
USPC ....... 119/226, 259, 245, 247, 232; D30/101, D30/104, 106; 210/157.21, 167.26
See application file for complete search history.

(56) References Cited

U.S. PATENT DOCUMENTS 1,194,250 A * 8/1916 Smits ..................... B01D 33/04 198/848
2,885,080 A * 5/1959 Myron ...................... B08B 3/14 210/411
3,802,565 A * 4/1974 Hughes .................. B01D 35/28 210/160
4,064,048 A * 12/1977 Downs ................... A01K 79/02 210/160
4,447,324 A * 5/1984 Jackson ................. B01D 33/04 210/159
4,495,891 A * 1/1985 Dugan ................... A01K 73/12 119/211
4,812,231 A * 3/1989 Wiesemann ........... B01D 33/04 210/159
5,300,221 A * 4/1994 Austevoll .............. B01D 33/50 210/159
5,993,651 A * 11/1999 Wiesemann ............ E02B 8/026 210/197

(Continued)

FOREIGN PATENT DOCUMENTS

GB 2174927 A * 11/1986 ............... B03B 5/00
KR 100905003 * 6/2009 ............. B01D 33/15

*Primary Examiner* — Andrea M Valenti
(74) *Attorney, Agent, or Firm* — Karen Tang-Wai Sutton

(57) ABSTRACT

A rotating filter assembly having a frame assembly supporting a mesh loop rotatable around lower and upper wheel assemblies by a drive assembly and sensors. The rotating filter assembly is partially submerged in an aquaculture tank filled with water, the driver assembly and sensors rotating the mesh loop in and out of the water. A submerged pump interface adjacent the mesh loop is attached to a pump, and a cleaning assembly is positioned on the frame assembly above the water. In use, the pump and pump interface draw water and debris onto the mesh loop and the sensors cause the drive and cleaning assemblies to automatically engage by rotating the mesh loop over a hopper of the cleaning assembly and spraying pressurized water on the mesh loop to dislodged debris that is then removed from the hopper. A method of use is also provided.

19 Claims, 9 Drawing Sheets

(56) References Cited

U.S. PATENT DOCUMENTS

| | | | | |
|---|---|---|---|---|
| 6,294,085 | B1 * | 9/2001 | Bache | B01D 33/04<br>210/160 |
| 7,029,577 | B2 * | 4/2006 | Cummins | B01D 33/11<br>119/260 |
| 7,344,638 | B2 * | 3/2008 | Conroy | B01D 33/37<br>210/232 |
| 2006/0032798 | A1 * | 2/2006 | DePaso | E02B 8/026<br>210/170.11 |
| 2015/0189862 | A1 * | 7/2015 | Lipscomb | B01D 35/26<br>210/232 |

* cited by examiner

DETAIL A
SCALE 0.200

DETAIL A (SECTION VIEW)
SCALE 0.200

ROTATING FILTER ASSEMBLY AND METHOD OF USE IN AQUACULTURE

CROSS-REFERENCE TO RELATED APPLICATIONS

This application claims benefit of provisional U.S. patent application Ser. No. 63/687,874 filed on 28 Aug. 2024, from which priority and benefit is claimed under all applicable sections of Title 35 of the United States Code including, but not limited to, Sections 120, 121, and 365(c), and which in its entirety is incorporated by reference into this application.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE ONLINE PATENT CENTER SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to the field of water filtering assemblies used for raising fish and other aquatic animals in large tanks or ponds, specifically, a rotating filter and pump assembly that captures and removes debris from the water before returning clean water to the tank or pond.

Background Art

Raising fish and other aquatic animals in tanks requires filtration of the water since unlike a natural pond or other body of water, the amount of water is finite and waste must be removed to keep the fish and animals healthy. Filters designed for a typical home aquarium work well for relatively small tanks, but large aquaculture systems raising shrimp and fish for food, for instance, require filtration at a much larger scale and require different types of filtration systems to maintain water quality efficiently and effectively.

One common filter used in aquaculture is a rotary drum filter, a cylindrical structure with a mesh screen wall surrounding an interior space, the rotary drum filter housed inside a filtration chamber positioned outside the aquaculture tank. The dirty water from the tank is typically gravity fed into the filtration chamber and onto the mesh filter screen of the rotary drum filter via a bottom drain or an overflow system in the case of large tanks. Dirty water contacts and is then filtered through the mesh screen wall of the filter, and the rotary drum filter can be configured so that the filtered water is either collected in the interior space of the drum, or outside the drum in the filtration chamber, with a filtered water collection hose leading from either the interior space or the filtration chamber, depending on the filtration direction chosen, that either leads the newly filtered water back to the tank or to be further filtered using other filtration equipment and methods, such as biological filters, etc. As the rotary drum filter turns, solids in the dirty water are trapped on the mesh screen Water is then sprayed onto the mesh screen to remove the solid waste, which is then removed to a waste drain, and the newly cleaned mesh screen is available for further water filtration and deposition of solid wastes thereon.

The rotary drum filter has an external tank position for several reasons: (1) the drum is bulky and would otherwise take up too much room in the tank; (2) the drum is easier to maintain if housed outside of the tank; (3) external location of the drum filter allows for better water control and waste removal; and (4) location inside the tank poses a hazard to small animals living inside the tank who can get sucked into the filter or injured by the rotation of the drum. The main drawback of housing the rotary drum filter outside of the tank is the dedicated space required to house the filter, as well as the need to include extra plumbing. Rotary drum filters typically have a circular cross section and thus a large drum requires significantly more space than a differently shaped filter. Other shapes such as oblong, which can use vertical space more effectively than a circular one, are not conducive to steady filtration as the drum turns, and thus in applications with tight space allowances, the drum filter cannot be used due to its geometry. Additionally, since rotary drum filters rely on gravity to pull the water through the mesh, and the water flow rate is limited by gravity, to increase the flow rate (volume per hour for example), the drum size must be increased, requiring even more space.

What is needed is a filtering system that is easy to maintain and operate and which can filter large quantities of water efficiently and effectively without risk to the animals in the tank or pond. What is also needed is a filtering system that can be positioned inside the tank or pond. What is still needed is a filtering system that has all the useful features of a rotary drum filter without the drawbacks of external location, size, and limited water flow rate.

DISCLOSURE OF INVENTION

A rotating mesh filter assembly adapted for partial submersion inside an aquaculture tank filled with water with a water surface, comprising a frame assembly having an upper end above the water surface and a lower end positioned below the water surface, the frame assembly supporting a mesh filter assembly comprising a mesh loop rotatably engaging at least one lower wheel assembly at the lower end of the frame and at least one upper wheel assembly at the upper end of the frame, with a drive assembly engaging either the upper or lower wheel assemblies so as to rotate the mesh filter assembly in a clockwise or counterclockwise direction around the lower and upper wheel assemblies where the mesh filter assembly rotates above and below the water surface. The mesh filter and the frame assemblies optionally include struts or horizontal bars for stabilization. A cleaning assembly comprising a hopper and a pressurized water spraying assembly are positioned at the upper end of the frame assembly. A pump interface of at least one pump assembly, the pump interface attached to a pump inlet is positioned immediately adjacent the mesh loop and when the pump assembly is operated, water from the tank is drawn through the mesh loop and into the pump interface and pump inlet, where solid debris in the water is deposited onto the mesh loop. In some embodiments, a silicone seal is positioned between the mesh loop and the pump interface. One or more sensors in communication with drive and cleaning assemblies evaluate a quantity of solid debris deposited onto the mesh loop and upon determining the mesh loop is clogged with debris, signals the drive and cleaning assemblies to engage to rotate the mesh loop above the hopper with pressurized water sprayed onto the mesh loop to allow solid debris to dislodge from the mesh loop and fall into the hopper to be removed. In some embodiments, the sensors automatically engage the drive and cleaning assemblies when the mesh loop is clogged, or in some embodiments include timers that automatically engage the drive and cleaning assemblies according to a preset schedule. The pump and drive assemblies are powered using prior art power sources and may share a same source. In some embodiments, the invention is adapted to use additional filters attached to a water outlet of the pump assembly and can include additional pump assemblies. The pump assembly may be supported on the frame assembly by a shelf, or in some embodiments the pump interface is attached to the frame assembly and a hose connects the pump interface with the pump inlet.

In a first aspect of the invention, the mesh loop of the mesh filter assembly is formed with a first edge, an opposed second edge, and a central position between the first and second edges, with a first rotating loop fixed to either the first edge or to the central position. The first rotating loop is either a first roller chain loop or a first belt.

In a second aspect of the invention, the upper and lower wheel assemblies each have at least one wheel engaging a shaft, the first rotating loop of the mesh loop engaging the at least one wheel of both the upper and lower wheel assemblies. When the first rotating loop is disposed as a first roller chain loop, the at least one wheel of each of the upper and lower wheel assemblies is disposed as a sprocket with a plurality of teeth adapted to engage the first roller chain loop. When the first lower chain loop is disposed as a first belt, the at least one wheel of each of the upper and lower wheel assemblies is disposed as a pulley wheel.

In a third aspect of the invention, the mesh loop positioned between the pressurized water spraying assembly and the hopper forms a V-shape with an angle centered over the hopper, whereby water sprayed onto the mesh loop that flows along the exterior side of the mesh loop is directed towards the angle.

In a fourth aspect of the invention, the drive assembly has either an indirect drive motor and includes either a pulley assembly or a drive chain assembly rotatably engaging either the upper or lower wheel assemblies, or a direct drive motor rotating the upper or lower shaft.

In a fifth aspect of the invention, the pulley assembly includes a drive pulley wheel engaging a second pulley wheel with a belt, the second pulley wheel rotated by the motor.

In a sixth aspect of the invention, the drive chain assembly includes a drive sprocket engaging a driven sprocket with a drive chain.

In a seventh aspect of the invention, both the drive assembly and the pulley assembly are affixed to the upper end of the frame assembly.

In an eight aspect of the invention, the first rotating loop of the mesh filter assembly is a first roller chain loop, and further comprising a second roller chain loop fixed to the second edge of the mesh loop, the upper and lower wheel assemblies are each further comprised of a second wheel formed with a plurality of teeth adapted to engage the second roller chain loop.

In a ninth aspect of the invention, a method of using the rotating mesh filter assembly is comprised of the steps of positioning the rotating mesh filter assembly into the tank such that the pump interface of the pump assembly is submerged below the water surface and immediately adjacent the mesh loop, and the cleaning assembly is positioned above the water surface; operating the pump assembly; evaluating whether the mesh filter assembly is clogged with debris; rotating the mesh filter assembly over the hopper; spraying water over the mesh filter assembly to dislodge the debris from the mesh filter assembly; collecting the debris from the mesh filter assembly inside the hopper; and removing the debris from the hopper.

In a tenth aspect of the invention the method step of evaluating is performed by a sensor, and wherein the steps of rotating and spraying are either automatically performed when the step of evaluating determines the mesh filter assembly is clogged or performed according to a predetermined schedule controlled by a timer included with the rotating filter assembly in communication with the sensor.

In yet another aspect of the invention, the method step of spraying uses water sourced from the pump outlet.

In a last aspect of the invention, the method step of rotating is further comprised of the mesh filter assembly forming a V-shape in a portion of the mesh filter assembly positioned directly above the hopper.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
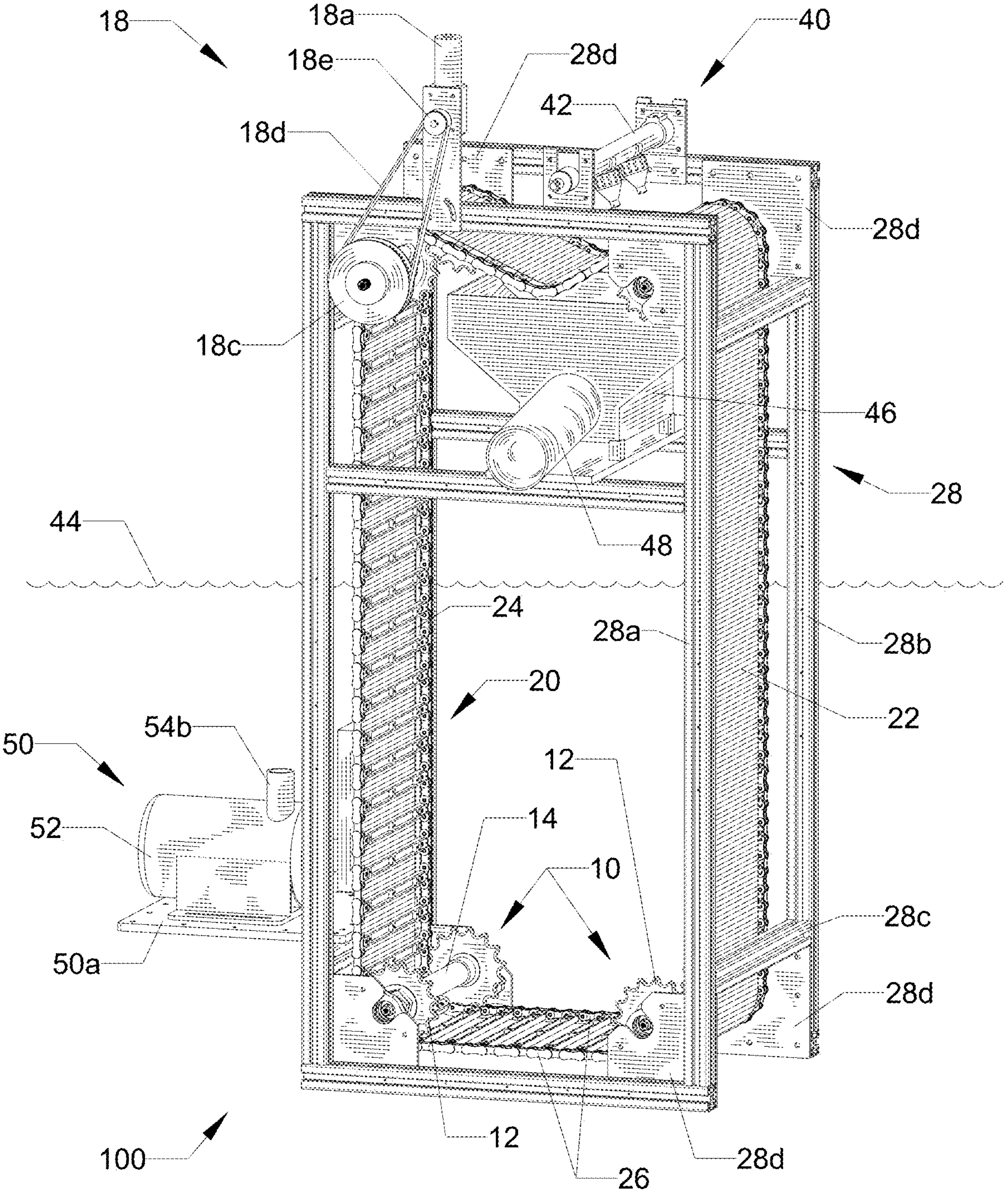
FIG. 1 is a first perspective view of a rotating mesh filter assembly according to the invention or filter assembly, shown with one pump assembly.

The following is a list of reference labels used in the drawings to label components of different embodiments of the invention, and the names of the indicated components:

100 rotating mesh filter assembly or filter assembly
10 sprocket assembly
12 sprocket
14 shaft
18 drive assembly
18*a* motor
18*c* first pulley wheel or drive pulley wheel 18*d* belt
18*e* second pulley wheel
20 mesh assembly
22 mesh filter loop or mesh loop
24 horizontal bar or support
26 roller chain loop
28 frame assembly
28*a* first frame portion
28*b* second frame portion
28*c* horizontal strut or strut
28*d* shaft support
30 solid waste or debris
40 cleaning assembly
42 spray assembly
44 water surface
46 hopper
48 waste pipe
50 pump assembly
50*a* shelf
52 pump
54*a* pump water inlet
54*b* pump water outlet
56 pump-mesh interface or interface
58 silicone seal
200 method
202 first step
204 second step
206 third step
208 fourth step
210 fifth step
212 sixth step
214 seventh step

DETAILED DESCRIPTION

A rotating filter assembly or filter assembly 100 and a method of use 200 are shown in a representative embodiment in the accompanying FIGS. 1-9. The filter assembly 100 is comprised of a frame assembly 28 comprising a first frame portion 28*a* and a second frame portion 28*b*, shown in the FIGS. as a pair of rectangles in spaced apart relationship connected by one or more horizontal bars or struts 28*c* maintaining the space apart relationship of the first and second frame portions 28*a* 28*b*, creating an interior space and additionally supporting the frame portions 28*a* 28*b*. The frame assembly 28 is sized such that when positioned inside a tank (not shown) having a quantity of water inside the tank, an upper end of the frame assembly 28 is positioned above a water surface 44 of the quantity of water in the tank and a lower end of the frame assembly 28 is positioned below the water surface 44, that is, is submerged in the quantity of water of the tank.

A mesh filter assembly 20 is comprised of a mesh filter material loop 22 positioned within the interior space between the first and second frame portions 28*a* 28*b* and having a same or smaller approximate width as the strut 28*c* positioned between the first and second frame portions 28*a* 28*b*. The mesh loop 22 is further supported by a series of horizontal bars 24 attached to the mesh loop 22 adapted to maintain tension in the mesh loop 22, with a pair of roller chain loops or chain loops 26 attached to opposed side edges of the mesh loop 22, in some embodiments also attached to the ends of the bars 24. The pair of chain loops 26 are rotatably coupled to four sprocket assemblies 10, each sprocket assembly 10 comprising a pair of identical sprockets 12 arranged on opposed sides of an axle or shaft 14, the shaft 14 rotatably supported on the frame assembly 28 by a frame support 28*d* in each corner of the frame assembly 28. The pair of chain loops 28 are adapted to couple with a plurality of teeth formed into the sprockets 12. The mesh assembly 20 thus is supported by the chain loops 26 rotatably coupled into the teeth around the sprockets 12. In the FIGS., the representative embodiment shows the mesh assembly 20 as a continuous loop with a non-circular cross section, in contrast to a prior art drum filter (not shown) that is a cylinder with a circular cross section.

The sprockets 12 are fixed in relation to the shaft 14 such that all components of the sprocket assembly 10 turn together as a single unit. A drive assembly 18 in the representative embodiment in the FIGS. is shown positioned at the upper end of the frame assembly 28 to allow for convenient maintenance of the drive assembly 18 although it could be positioned anywhere along the frame assembly 28, including below the water surface 44. The drive assembly 18 in the representative embodiment is comprised of a motor 18*a* with a power supply (not shown), such as a battery, generator, public electricity supply, etc., a pulley-belt system having a drive pulley wheel 18*c* connected to a second pulley wheel 18*e* by a belt 18*d*, and a drive sprocket assembly 10*a*, where the drive pulley wheel 18*c* is fixed to the shaft 14 of the drive sprocket assembly 10*a*. The motor 18*a* turns the second pulley wheel 18*e* which then turns the drive pulley wheel 18*c*, rotating the sprocket 12 of the drive sprocket assembly 10*a*, forcing the chain loops 26 to move along the sprockets 12 of the sprocket assemblies 10 and moving the mesh assembly 20 around the sprocket assemblies 10 of the filter assembly 100.

While the representative embodiment uses a pulley-belt system, a direct drive system using a direct drive rotary motor where the motor 18*a* directly turns the shaft 14 is also an acceptable arrangement as are other known drive arrangements and thus the pulley-belt system in the representative embodiment is just one example of a useful drive assembly for the filter assembly 100 and is not meant to be limiting.

Figure 7:
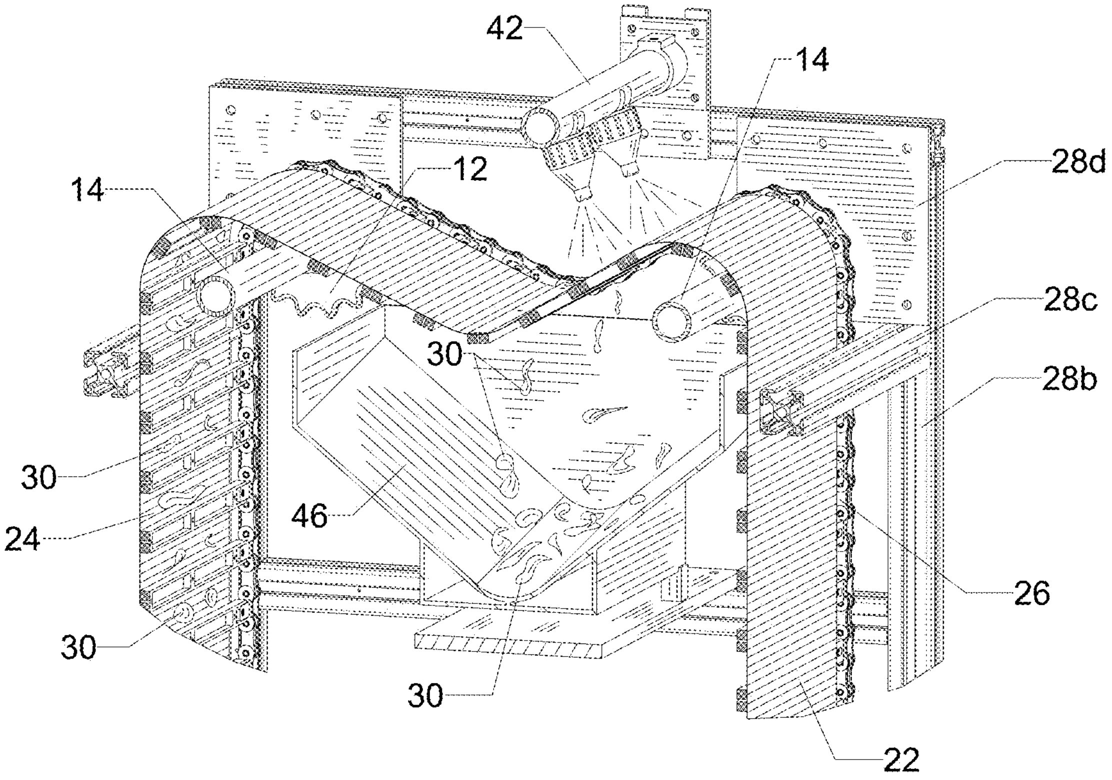
FIG. 7 is a partial section view of the detail view in FIG. 6.
Figure 8:
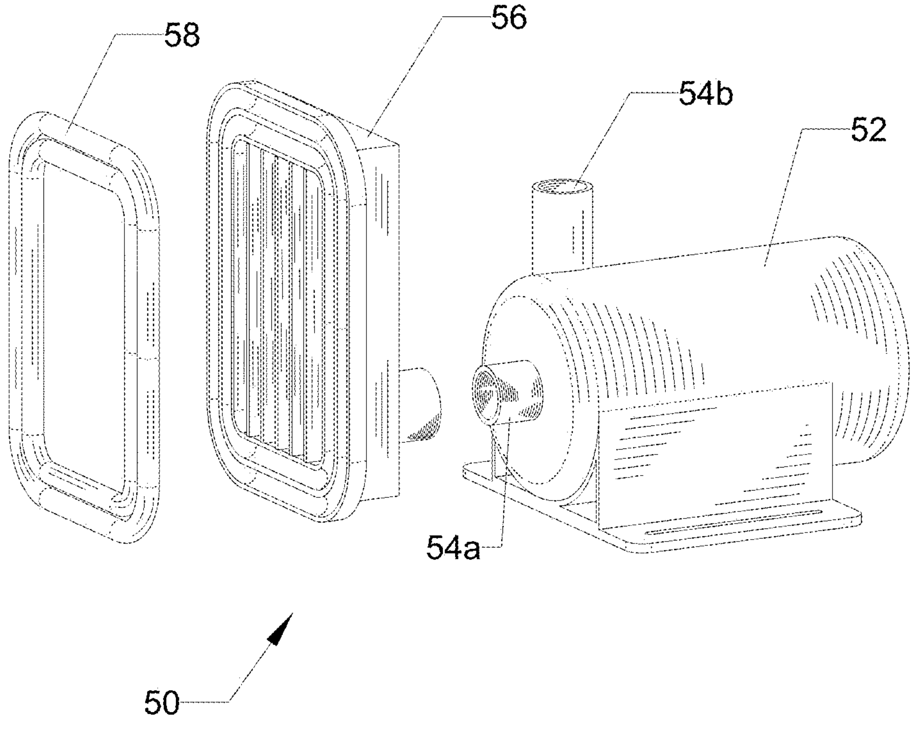
FIG. 8 is a partial exploded view of the pump shown in FIGS. 1 and 3.

One or more pump assemblies 50 are positioned outside the interior space of the frame assembly 28 on an optional shelf 50*a* and a pump inlet 54*a* and its pump-mesh interface or interface 56 of the pump assembly 50 are ideally positioned to touch the mesh loop 22. An optional silicone seal 58 is attached to the interface 56 to prevent damage to the mesh loop 22 by the interface 58 and also to protect the interface 58 from contact with the chain loops 26. The interface 56, shown in FIG. 7, is a funnel-like widened and elongated structure sized to fit between the chain loops 26 and formed with a series of openings adapted to draw water into the pump inlet 54*a*. The interface 56 is sized and shaped to deposit debris 30 evenly and optimally from the tank water onto the entire mesh loop 22 surface, unlike the prior art drum filters where gravity flow of water can result in uneven deposits of debris along the filter surface. A pump 52 of the pump assembly 50 is powered by a pump power source (not shown) that can be a same or different power source from that of the drive assembly 18.

A cleaning assembly 40 comprising a hopper 46, sprayer assembly 42, and a source of clean pressurized water are positioned at the upper end of the frame assembly 28 above the water surface 44. The hopper 46 is positioned just below the mesh loop 22, with the sprayer assembly 42 and the source of rinsing water positioned above the mesh loop 22. A waste pipe 40 allows dirty water and solids 30 rinsed into the hopper 46 to be removed and either discarded or sent for further filtration.

Figure 9:
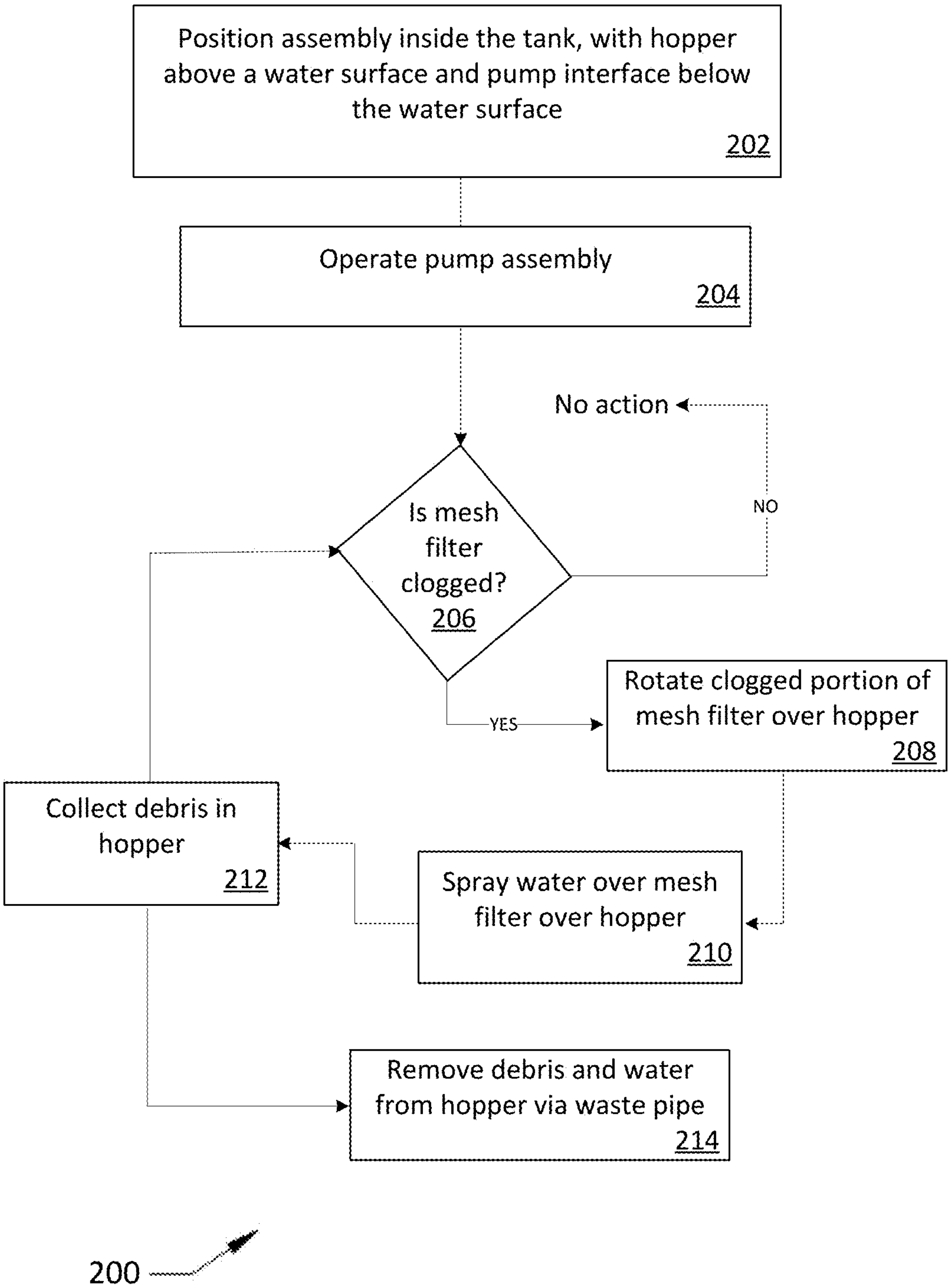
FIG. 9 is a flow diagram of a method of using the filter assembly in FIGS. 1 and 2.

To use the filter assembly 100, the method 200 is diagrammatically shown in FIG. 9 in seven steps. In a first step

202, the filter assembly 100 is positioned inside the tank holding the quantity of water, such that the upper end of the filter assembly 100 is above the water surface 44, and the pump interface 56 is submerged below the water surface 44. To be clear, the pump 52 and the pump inlet 54*a* could also be submerged, as shown in FIG. 1 for instance, or the pump 52 could be above or below the water surface 44 with the pump inlet 54*a* attached to the pump interface 56 by a hose (not shown), typically a flexible hose or tube so as to position the pump 52 and pump inlet 54*a* away from the frame assembly 28. In a second step 204, the pump assembly 50 is operated so that water from the tank is continuously drawn through the mesh loop 22, into the pump inlet 54*a*, through the pump 52, and out the pump outlet 54*b*. The water exiting the pump outlet 54*b* may be returned immediately to the tank or sent to another separate filtration step before being returned to the tank. In a third step 206, the mesh loop 22 is evaluated as to whether it is clogged or occluded with debris 30. This evaluation step 204 may be performed with one or more sensors (not shown) that visualize the debris 30, flow sensors (not shown) built into the pump assembly 50, such as into the pump interface 56, noting that a clogged mesh loop 22 likely will impact water flow rate into the pump inlet 54*a*, or other known means and methods of evaluating whether the mesh loop 22 is clogged or otherwise blocked with debris 30 and thus no longer efficiently removing debris 30 from the water in the tank. The sensor further communicates with the drive assembly 18 and the cleaning assembly 40 using wired or wireless means. If the sensor in the evaluation step 204 detects the mesh loop 22 is not clogged, the pump assembly 50 continues to draw water and debris through the mesh loop 22 and the drive assembly 18 is not engaged. If the mesh loop 22 is determined to be clogged, in a fourth step 208, the sensor signals to the drive assembly 18 to rotate the mesh loop 22 over the hopper 46, where in a fifth step 210, pressurized water from the water supply is directed at the dirty mesh loop 22 through the spraying assembly 42, again as directed by the sensor. In a sixth step 212, debris 30 is dislodged from the mesh loop 22 and collected into the hopper 46. In a seventh step 214, the debris 30 and rinsing water are removed from the hopper 46 through the waste pipe 40. The steps of evaluating 206, rotating 208 and spraying 210 are ideally automatically performed in the representative embodiment, or could include a manual operation option.

The method 200 shown in FIG. 9 illustrates an advantageous embodiment where more efficient use of electricity and water is desired. In other embodiments, the step of evaluating 206 may also be replaced by rotating the mesh loop in the fourth step 208 according to a timed schedule, or the fourth step 208 may be continuous, activating when the pump assembly 50 is operated in the second step 204. The inventor notes that continuous rotation of the mesh loop 22 may be desired in some applications where aggressive water filtration is sought, for instance, where the aquaculture tank is overcrowded or the water conditions are unusually dirty and extra filtration is desired, however rotating the mesh loop 22 intermittently only when it is clogged and only using the spray assembly 42 when needed efficiently uses electricity and rinsing water, which can result in significant cost savings in large aquaculture applications. The size of the interface 56 and arrangement of the slots in the representative embodiment in the FIGS. more effectively and evenly deposits debris 30 onto the whole useable mesh loop 22 surface area, for even more efficient filtration of the water in the tank. Many prior art filtration systems deposit debris more heavily in some areas of the filter and less in others, resulting in less effective filtration for the filter size in terms of energy and rinse water used.

In the rotating step 208, the mesh loop 22 is rotated either in a clockwise or counterclockwise motion and in some embodiments, the direction of rotation of the mesh loop 22 may alternate according to a schedule or as desired.

The water supply for rinsing the mesh loop 22 can be from a separate clean water source or could be water from the tank itself, such as the water exiting the pump outlet 54*b* or simply drawn from the tank's own water. The inventor notes that like any pump-filtration system, chemical filtration at the site of the submerged pump 52 is also possible and is another embodiment of this invention. The rotating filter assembly 100 is highly effective for keeping relatively large amounts of water in aquaculture tanks clean, with minimal disruption or danger to the animals in the water. In particular, the intermittent rotation of the mesh loop 22 and the vertical orientation of the filter assembly 100 minimizes animal injury that might otherwise be caused by a large circular drum rotating constantly inside the tank.

Figure 2:
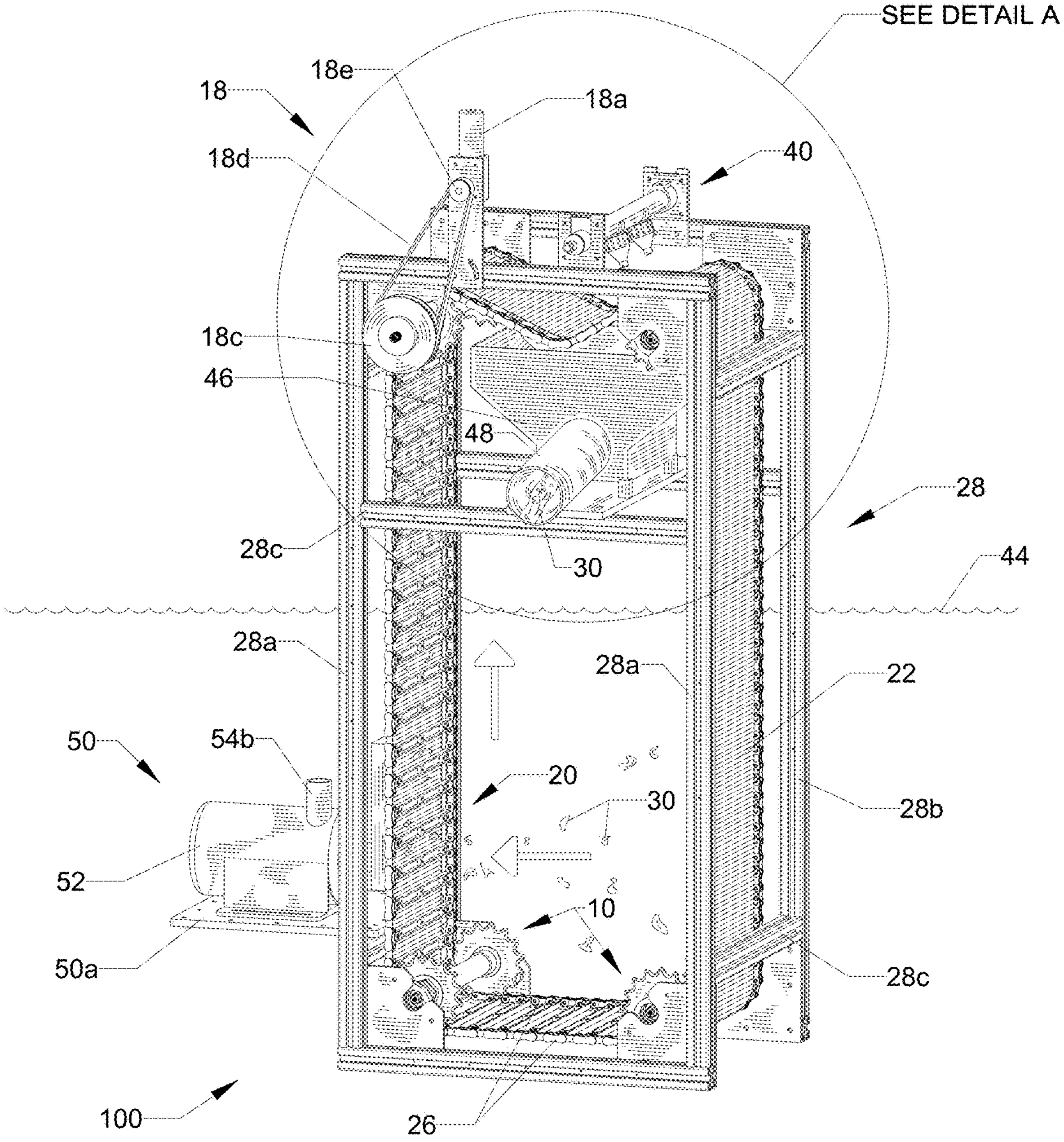
FIG. 2 is a second perspective view of the filter assembly in FIG. 1, in a diagrammatic representation of the filter assembly in active operation.
Figure 3:
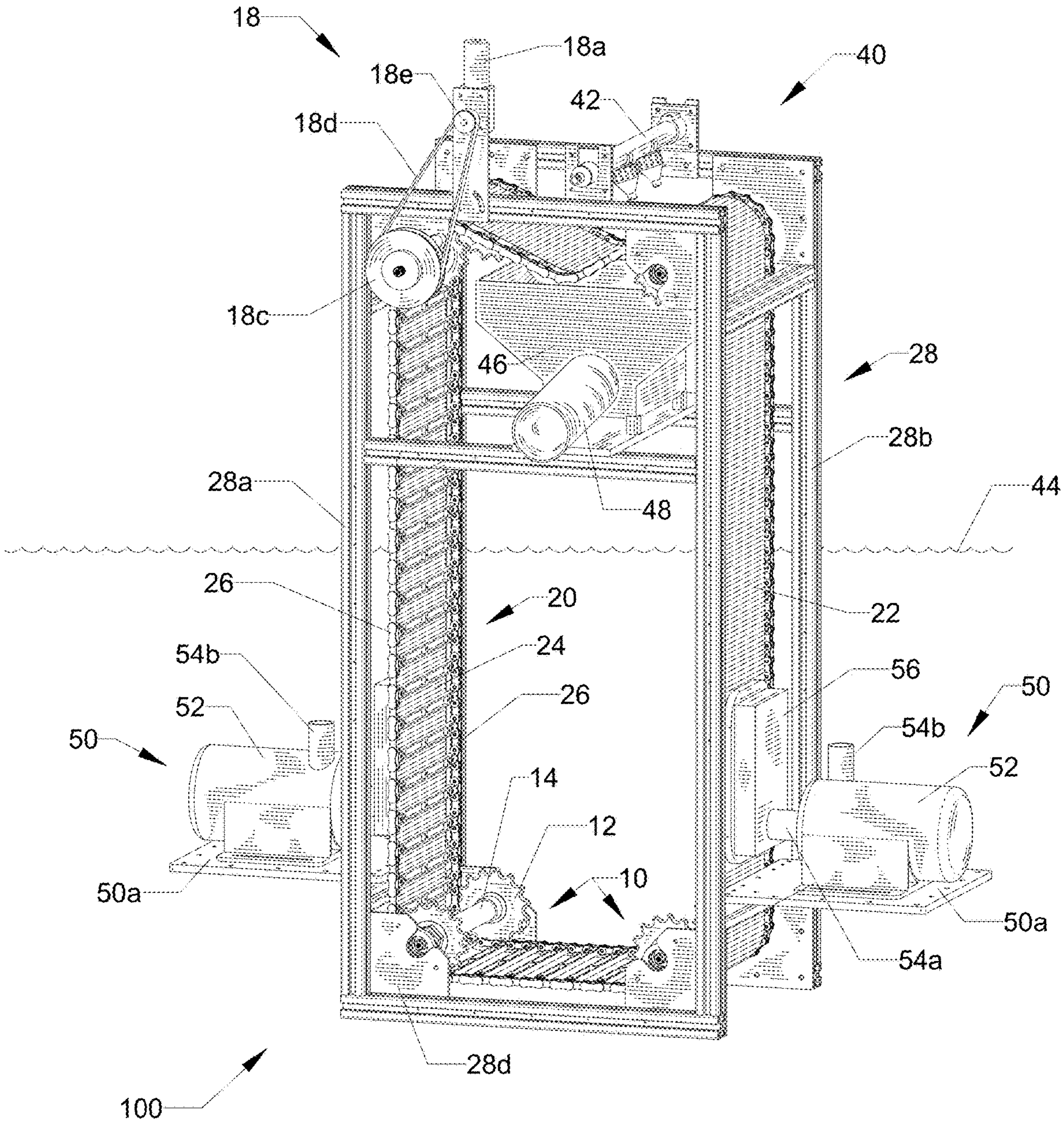
FIG. 3 is another perspective view of the filter assembly, shown with a pair of pump assemblies.
Figure 4:
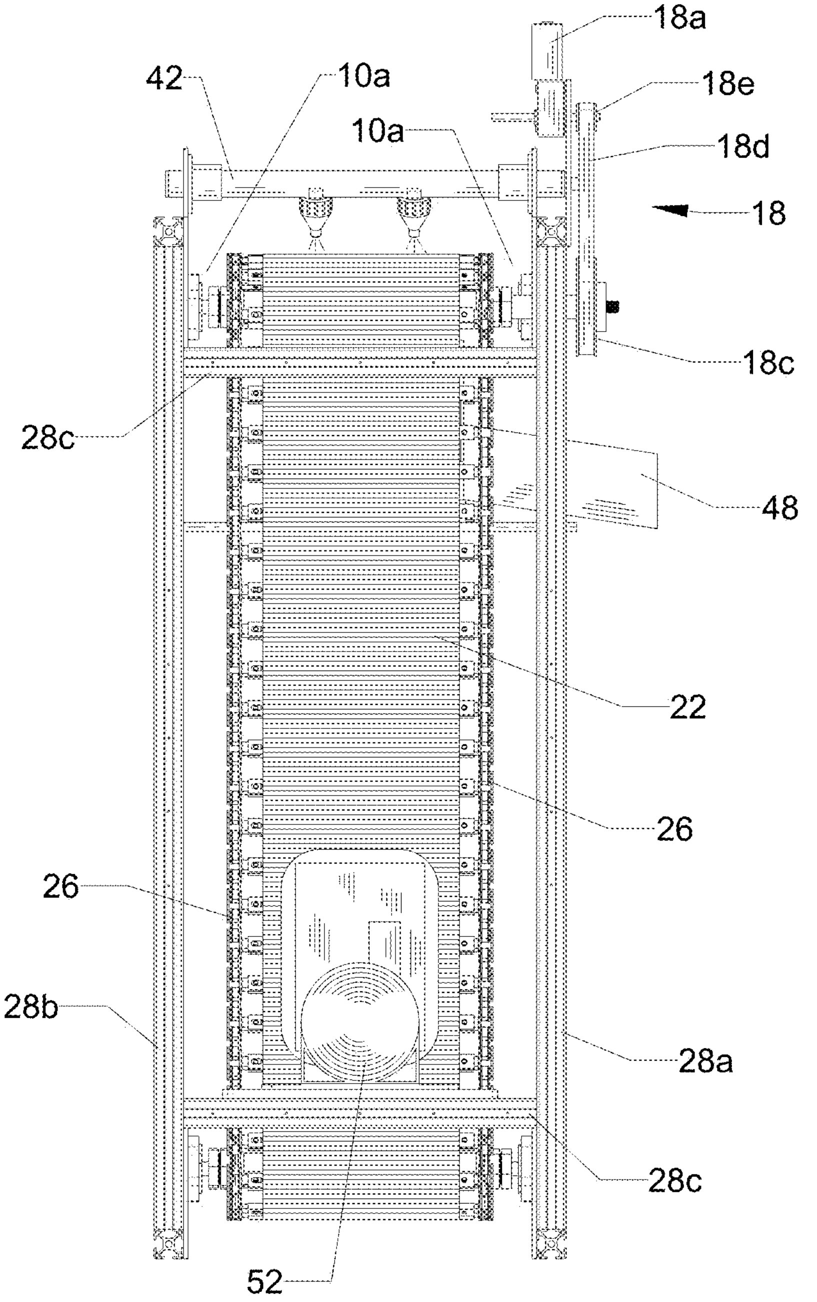
FIG. 4 is a left side elevation view of FIG. 1.
Figure 5:
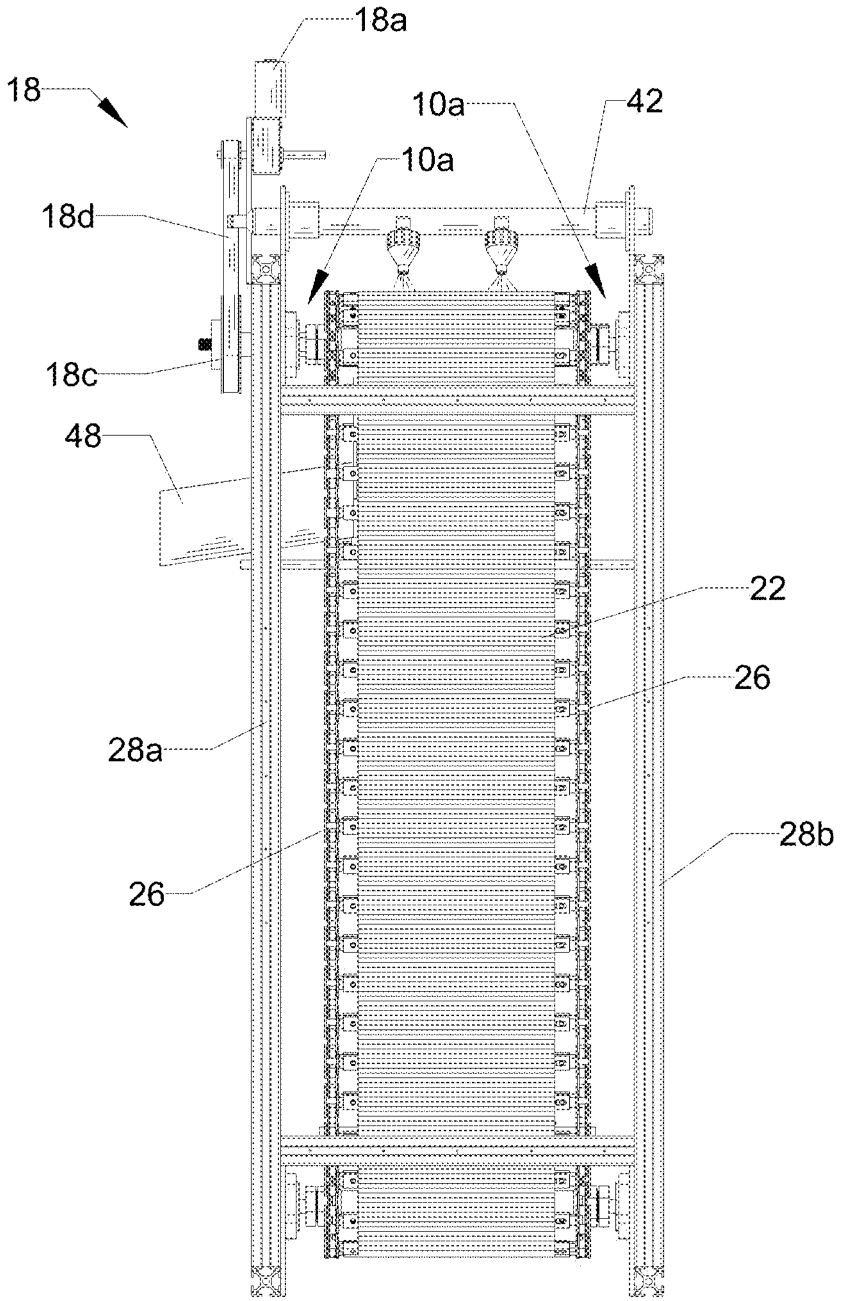
FIG. 5 is a right side elevation view of FIG. 1.
Figure 6:
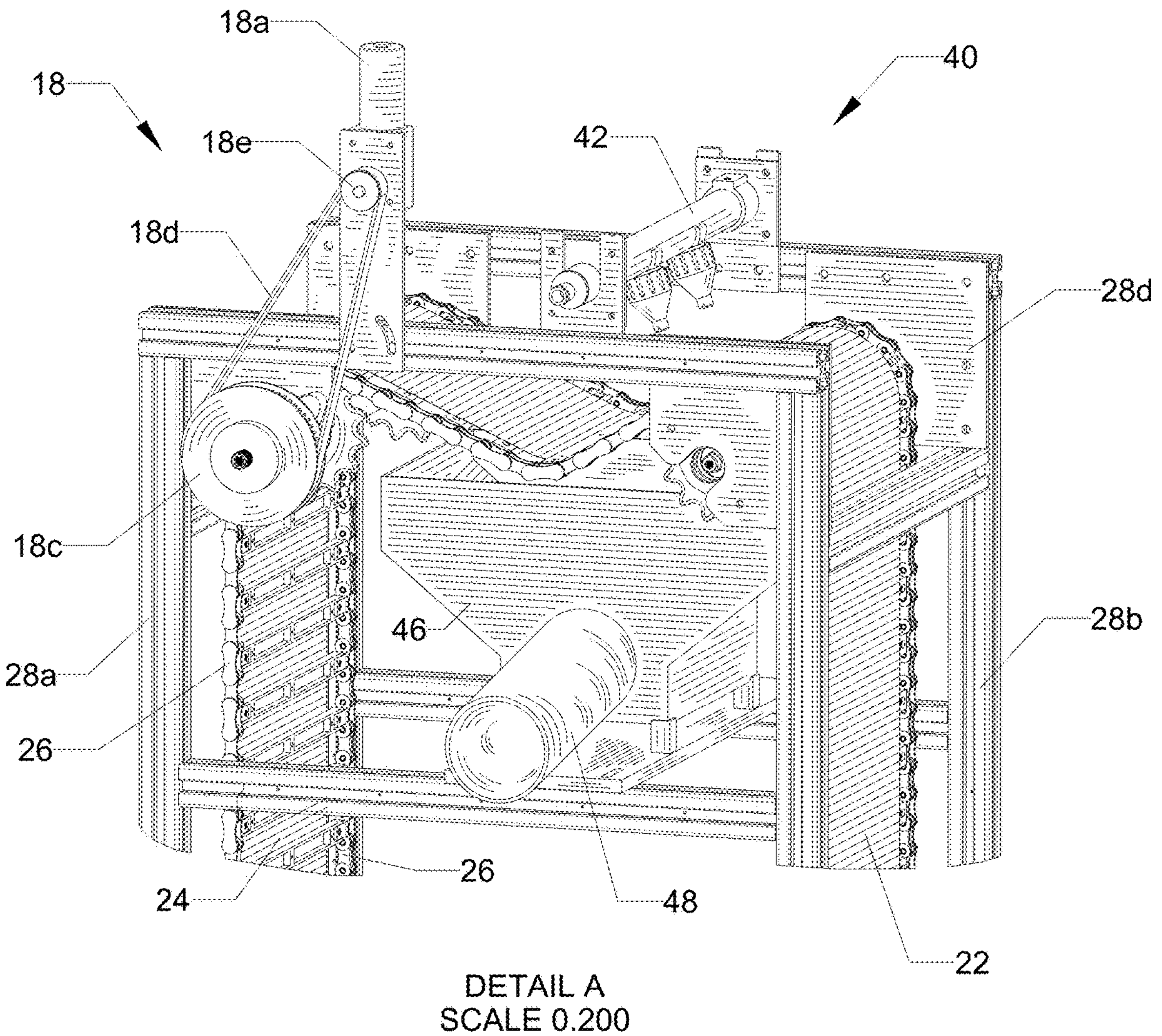
FIG. 6 is a detail view of an upper portion of the filter assembly in FIG. 1.

The filter assembly 100 and method of use 200 draw water into the center of the filter assembly 100, as opposed to using gravity filtration by pouring tank water onto the mesh filter of the prior art rotary drum filter. The submerged pump 52 in FIG. 1 or multiple pumps 52, as shown in FIG. 2, create water circulation, and if desired, the pump outputs 54*b* can be extended above the water surface to create splashing to help aerate the water.

Since filtration is not gravity fed as per the prior art drum filters, the mesh loop 22 design can more efficiently use space within the tank with its vertical orientation and thus be conveniently positioned inside the tank, eliminating extra piping and external tank space currently needed with drum filters. With a tank, vertical space is often generous and unused, and the filter assembly 100 and method of use 200 can thus effectively use precious horizontal space on the ground around the tanks for more or bigger tanks without compromising filtration while leveraging vertical space within the facility. The representative embodiment shown in the FIGS. illustrates a filter assembly 100 whose width is less than its height with a rounded rectangular cross section with a "v" indent at the upper end of the filter assembly 100, compared to the prior art drum filter where width and height are the same. However, the inventor notes that the filter assembly 100 could be any desired closed shape for the mesh loop 22, and thus adjustments to the frame assembly 28 and sprocket assemblies 10 can be made to accommodate tight spaces. For instance, the mesh loop 22 could be configured as an isosceles triangle with a single sprocket assembly 10 at the vertex angle, when a base of the triangle is positioned above the water surface 44, and thus only 3 sprocket assemblies used, or L shaped assemblies, etc. A simplest embodiment of the filter assembly 100 is a pair of sprocket assemblies positioned above and below the water surface 44 centered on the frame assembly 28 (rather than positioned in the corners as shown in the representative embodiment) to form a narrow columnar filter assembly 100.

It is to be understood that the above-described arrangements are only illustrative of the application of the principles of the present invention. Numerous modifications and alternative arrangements may be devised by those skilled in the art without departing from the scope of the present invention. For instance, the drive assembly 18 is shown in the representative embodiment as positioned above the water surface 44 but could also be submerged (below the water surface 44), but the inventor believes the above water position is advantageous for maintenance of the drive assembly 18.

Similarly, the pump assembly 50 in the representative embodiment is shown submerged, with all components also submerged and positioned near a bottom of the tank, and many acceptable variations of this arrangement are possible. For instance, the submerged pump or pumps 52 can be positioned at varying depths within the water and could be designed to rest on a retractable shelf 50*a* as shown in the representative embodiment in the FIGS., where the shelf can be optionally arranged so as to be adjustable vertically along the frame assembly 28 to allow easy access for servicing, to provide different water filtration zones, or to even encourage water circulation within the tank. The pump 52 location can also vary from what is shown in the representative embodiment; it could be positioned either above or below the water surface 44, and does not even need to adjacent the frame assembly 28 or the mesh loop 22 if the filter interface 56 and seal 58 are attached to the frame assembly 28 so as to contact the mesh loop 22, and then a pipe or hose (not shown) can be used to connect the pump inlet 54*a* to the filter interface 56, eliminating the need for the shelf 50*a* and positioning the pump 52 along the frame assembly 28.

The inventor notes that minimally a single chain loop 26 could be used, however the use of two chain loops 26 as shown in the representative embodiment also protects the edges of the mesh loop 22 from damage and ensures even rotation of the mesh loop 22.

The use of "sprocket assembly" and "chain loop" describing the representative embodiment in the FIGS. is not meant to limit the filter assembly 100 to just sprocket-chain configurations but rather the term "sprocket assembly" includes a wheel, with or without teeth, mounted to a rotating shaft engaging a rotating loop structure, the rotating loop structure included in the term "chain loop", such that the rotating loop structure travels around the wheel when the wheel is rotated by the motor or other means. Thus, "sprocket assembly" includes all belt-pulley assemblies and other variations where there is a shaft connecting a pair of wheels. In fact, the simplest arrangement could include a single wheel with a belt directly engaging a shaft, so a pair of pulleys engaging a belt is not necessarily the only arrangement according to the invention. The inventor notes that the representative embodiment is cost effective and durable overall however some applications may prefer to simply replace components of the filter assembly 100 rather than repair them in cases where repair is difficult or unavailable for a variety of reasons and thus less expensive components may be desirable.

The inventor also notes that the chain-sprocket and belt-pulley systems shown in the representative embodiment can be configured so to use just chain-sprocket systems or just belt-pulley systems, and other variations, so the chain-sprocket and belt-pulley systems are interchangeable. The inventor believes however that the chain-sprocket and belt-pulley arrangement in the representative embodiment balances durability, cost, and ease of maintenance for large aquaculture applications but notes that using a belt-pulley system in lieu of or in addition to the chain-sprocket arrangement in the representative embodiment in the FIGS. for rotating the mesh loop 22 is another useful embodiment of the present invention and included in this disclosure.

Other embodiments and alternative arrangements include centering one chain loop 26 (or belt if used in lieu of the chain loop) on the mesh loop 22 instead of along the first or second edges of the mesh loop 22. The representative embodiment shows the chain loop 26 and sprocket assembly 10 along the sides of the mesh loop 22, which helps keep the chain loop 26 and sprocket teeth clean and increases the surface area of the mesh loop 22 for debris 30 containment, however the central location of the chain loop/belt along the mesh loop 22 is also acceptable. The inventor notes too that the belt-pulley drive system can also be replaced with a drive chain assembly comprising a drive sprocket, a driven sprocket and a drive chain engaging the drive and driven sprockets. As previously mentioned, the motor 18*a* can also directly turn the shaft 14 of the drive sprocket assembly 10*a* (in FIG. 1, the sprocket assembly 10*a* located at the upper left side of the frame assembly 28) and eliminate the belt-pulley or a drive chain assembly.

What is claimed is:

1. A rotating mesh filter assembly adapted for partial submersion inside a non-partitioned aquaculture tank holding a quantity of water and housing aquatic animals swimming freely within the quantity of water, the quantity of water having debris distributed therein and a water surface, the rotating mesh filter assembly comprising:

a frame assembly comprising a pair of frames in spaced apart relationship forming a gap between the pair of frames, each frame of the pair of frames having an upper end and a lower end, the upper ends of the pair of frames adapted to be positioned above the water surface and the lower end adapted to be positioned below the water surface;

a mesh filter assembly having a mesh loop with a first edge, an opposed second edge, and a central position between the first and second edges, with a first rotating loop fixed to either the first edge or to the central position, the mesh loop further having an exterior facing side and an interior facing side;

wherein the first rotating loop is either a first roller chain loop or a first belt;

a lower wheel assembly having at least one lower wheel engaging a lower shaft positioned at the lower end of the pair of frames, the at least one lower wheel either disposed as a sprocket with a plurality of radial projections adapted to engage the first rotating loop disposed as a first roller chain loop, or the at least one lower wheel disposed as a pulley wheel adapted to engage the first rotating loop disposed as the belt;

an upper wheel assembly having at least one upper wheel engaging an upper shaft positioned at the upper end of the pair of frames, the at least one upper wheel disposed as either a sprocket having a plurality of radial projections adapted to engage the first rotating loop disposed as the first roller chain loop passing over the plurality of radial projections, or the at least one upper wheel disposed as a pulley wheel adapted to engage the first rotating loop disposed as the belt;

wherein either the lower wheel assembly or the upper wheel assembly is rotatable relative to the pair of frames;

wherein the mesh filter assembly is sized and shaped to fit within the gap between the pair of frames and has a non-circular cross section when the first rotating loop engages both the lower and upper wheel assemblies;

a drive assembly having a motor with a power source mechanically engaging either the upper wheel assembly or the lower wheel assembly;

wherein the motor is powered by the power source;

wherein the motor turns either the upper or lower wheel assembly, whereby operating the drive assembly rotates the mesh filter assembly around the upper and lower wheel assemblies such that the mesh filter assembly rotates in a first direction so that a portion of the mesh filter assembly positioned above the water surface is rotated below the water surface;

a pump assembly having a pump with a water inlet, the water inlet attached to a pump interface touching the exterior facing side of the mesh loop, the pump further having a water outlet and a pump power source;

wherein the pump interface is a widened and elongated structure formed with a series of openings adapted to draw the quantity of water into the water inlet and to evenly deposit debris in the quantity of water onto the interior facing side of the mesh loop;

a cleaning assembly having a water spraying assembly adapted to spray water supplied from a water source, a hopper positioned below and in spaced apart relationship with the water spraying assembly, and a waste pipe formed into the hopper;

wherein the cleaning assembly is positioned above the water surface;

wherein the mesh loop is positioned between the water spraying assembly and the hopper; and a sensor in communication with the drive and cleaning assemblies, the sensor evaluating whether the mesh filter assembly is clogged with debris and signaling the drive and cleaning assemblies to operate-;

wherein the pump draws the quantity of water through the interior facing side of the mesh loop;

wherein the series of openings in the pump interface channel the quantity of water into the water inlet of the pump so as to deposit debris evenly onto the interior facing side of the mesh loop; and wherein the cleaning assembly sprays water from the water source onto the exterior facing side of the mesh loop.

2. The rotating mesh filter assembly in claim 1, wherein the first direction is a clockwise or a counterclockwise direction.

3. The rotating mesh filter assembly in claim 1, wherein the mesh loop positioned between the water spraying assembly and the hopper forms a V-shape with an angle centered over the hopper, whereby water sprayed onto the mesh loop that flows along the exterior side of the mesh loop is directed towards the angle.

4. The rotating mesh filter assembly in claim 1, wherein the drive assembly has either an indirect drive motor and includes either a pulley assembly or a drive chain assembly rotatably engaging either the upper or lower wheel assemblies, or a direct drive motor rotating the upper or lower shaft.

5. The rotating mesh filter assembly in claim 4, wherein the pulley assembly includes a drive pulley wheel engaging a second pulley wheel with a belt, the second pulley wheel rotated by the motor.

6. The rotating mesh filter assembly in claim 4, wherein the drive chain assembly includes a drive sprocket engaging a driven sprocket with a drive chain.

7. The rotating mesh filter assembly in claim 4, wherein the drive assembly and the pulley assembly are affixed to the pair of frames above the water surface.

8. The rotating mesh filter assembly in claim 1, wherein the first rotating loop of the mesh filter assembly is a first roller chain loop, and further comprising a second roller chain loop fixed to the second edge of the mesh loop, the upper and lower wheel assemblies are each further comprised of a second wheel formed with a plurality of teeth adapted to engage the second roller chain loop.

9. The rotating mesh filter assembly in claim 1, further comprising a timer in communication with the sensor.

10. The rotating mesh filter assembly in claim 1, wherein the mesh filter assembly is further comprised of at least one horizontal bar affixed to either the mesh loop perpendicular to the first edge or to the first rotating loop.

11. The rotating mesh filter assembly in claim 1 wherein the pump power source and the power source for the drive assembly are a same source.

12. The rotating mesh filter assembly in claim 1, further comprising a second filter assembly adjacent the mesh loop.

13. The rotating mesh filter assembly in claim 1 wherein the frame assembly further comprises at least one strut positioned in the gap secured to the pair of frames, whereby the spaced apart relationship of the pair of frames is maintained.

14. The rotating mesh filter assembly in claim 1, wherein the frame assembly is further comprised of a shelf adapted to support the pump assembly.

15. The rotating mesh filter assembly in claim 1, wherein the pump interface is attached to the frame assembly, and the pump assembly further comprises a hose connecting the pump inlet to the pump interface.

16. A method of using the rotating mesh filter assembly in claim 1 in a non-partitioned aquaculture tank holding a quantity of water housing aquatic animals swimming freely therein, the quantity of water further having debris distributed therein and having a water surface, the method comprising the steps of:

positioning the rotating mesh filter assembly into the aquaculture tank such that the pump interface of the pump assembly is submerged below the water surface and immediately adjacent the mesh loop, and the cleaning assembly is positioned above the water surface;

operating the pump assembly;

evaluating whether the mesh filter assembly is clogged with debris;

rotating the mesh filter assembly over the hopper;

spraying water over the mesh filter assembly to dislodge the debris from the mesh filter assembly;

collecting the debris from the mesh filter assembly inside the hopper; and removing the debris from the hopper.

17. The method in claim 16, wherein the step of evaluating is performed by a sensor evaluating debris visually or by changes in water flow rate, and wherein the steps of rotating and spraying are either automatically performed when the step of evaluating concludes the mesh filter assembly is clogged or performed according to a predetermined schedule controlled by a timer included with the rotating filter assembly in communication with the sensor.

18. The method in claim 16, wherein the step of spraying uses water sourced from the pump outlet.

19. The method in claim 16, wherein in the step of rotating, the mesh filter assembly forms a V-shape in a portion of the mesh filter assembly positioned directly above the hopper.

* * * * *